Aug. 20, 1935.  G. G. KITZMAN  2,012,012
ELASTIC POWER TRANSMISSION LINK
Filed March 11, 1932
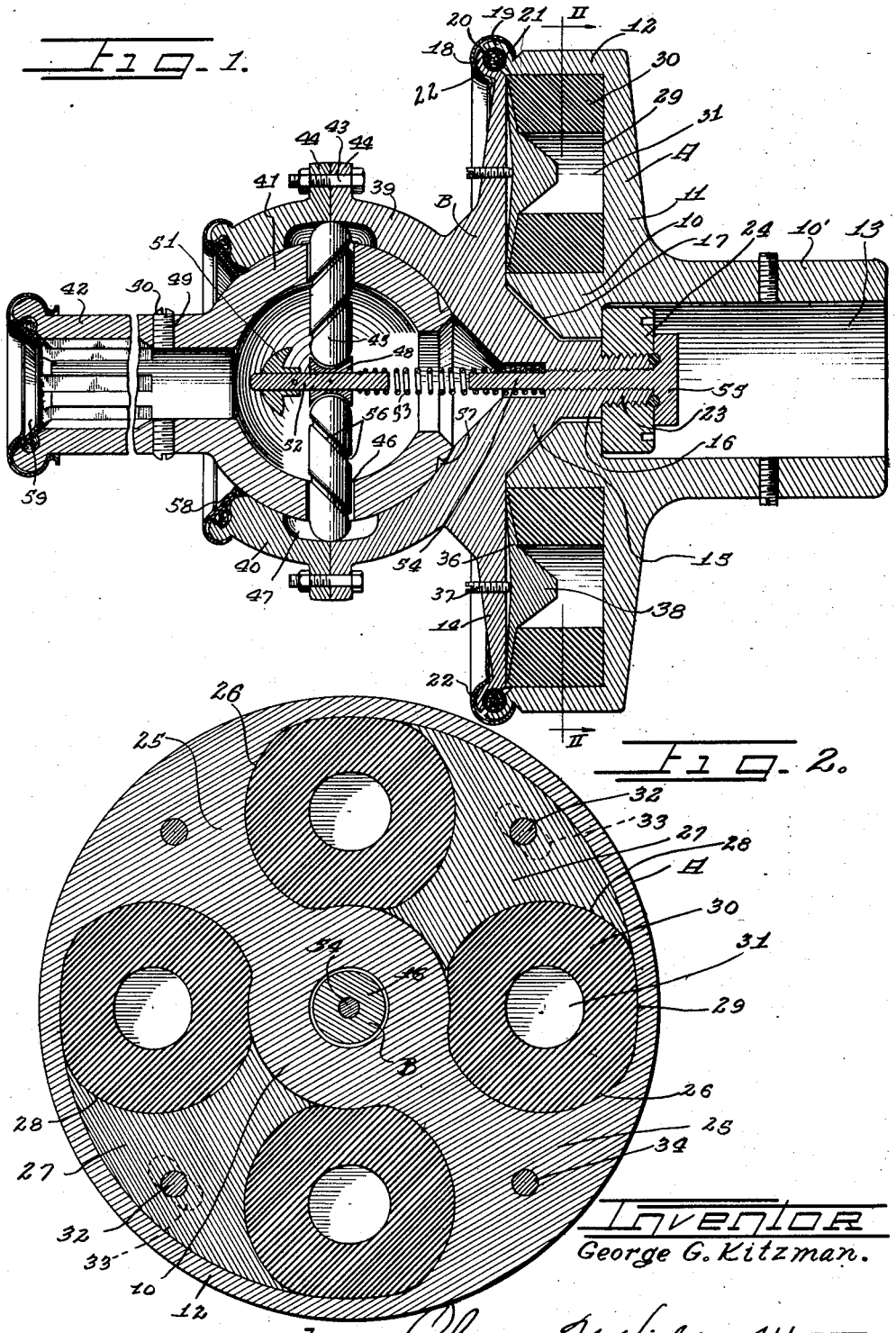
Inventor
George G. Kitzman.

Patented Aug. 20, 1935

2,012,012

UNITED STATES PATENT OFFICE 2,012,012

ELASTIC POWER TRANSMISSION LINK

George G. Kitzman, Chicago, Ill., assignor to Monad Corporation, Chicago, Ill., a corporation of Illinois Application March 11, 1932, Serial No. 598,223

14 Claims. (Cl. 64—96)

My invention relates to an improved elastic connection or link adapted for general use and application between relatively movable elements for cushioning and absorbing shocks or vibrations incident to the energy surges and pulsations in their inertia action and reaction, as for example in the transmission of power from a driving source such as an automotive engine, or in the relative movement between the vehicle body, springs and axles.

An important object of the invention is to utilize, in a novel and more practical and efficient manner, an elastic resistance medium such as rubber which of itself is non-compressible.

In elastic power transmissions or shock absorbing devices heretofore devised, wherein rubber performs the cushioning, dependence is placed wholly upon the reaction or resiliency of the rubber consequent upon depression or extrusion either in a lateral or linear direction. This action involves merely the cohesive factor of the medium for tensile capacity and reaction. It was therefore necessary, where the rubber itself is non-compressible, to provide external space for receiving the overflow or extrusion of the rubber when subjected to pressure, the resistance to such distortion of the rubber having been depended upon as the elastic resistance for giving the cushioning or shock absorbing effect. In such prior devices the resistance and elastic reaction characteristics of the rubber cannot be fully taken advantage of.

In accordance with my invention I provide units of resistant elastic rubber which of itself is mobile but non-compressible, and I so form and shape the units that they will be engaged along their entire outer surface by relatively movable members to be controlled in order that when such members are moved to cooperate with a unit, the unit will be subjected to uniform distortion or displacement pressure in centripetal direction, each unit being provided with a substantially central clearance space for permitting such displacement or distortion of the unit without any change in volume thereof. When the clearance space within the unit is closed to the atmosphere, or where the units are so confined in the transmission structure that these inner clearance spaces are closed to the atmosphere, such spaces will confine bodies of air whose resistance to compression will assist the resistance of the units to distortion and displacement, and conversely, the expansion of the compressed air will assist the retraction movement of the rubber unit. With my improved arrangement therefore each part or molecule of the rubber of a unit performs substantially the same amount of work for resisting and cushioning movements between relatively movable members to be controlled or connected for transmission or other purposes.

My invention will be fully understood by referring to the drawing on which

Figure 1 is a diametral section through a transmission link adapted particularly for insertion in the driving train between an automotive engine and the differential gearing connected with the driving axle; and Figure 2 is a section on plane II—II of Figure 1.

On the structure shown the member A may be called the driving member and the member B the driven member. The member A may be connected with a vehicle engine through the transmission gearing and the member B may be connected through a train of transmission mechanism with the driving axle of the vehicle.

The member A comprises a cylindrical hub 10 intermediate the ends of which is supported the body or disc 11 having the cylindrical flange 12 extending inwardly from its periphery concentric with and surrounding the inner part of the hub. The outer end 10' of the hub has the bore 13 for receiving a driving shaft driven from the vehicle engine.

The member B comprises the cylindrical wall or disc 14 having the conical hub section 15 terminating in the cylindrical end 16, the hub section fitting into the concentric passageway 17 through the hub 10 and communicating with the bore 13. Around its periphery the wall 14 has the flange 18 of substantially semi-circular cross section for cooperating with a similarly shaped flange 19 at the outer end of the cylindrical flange 12 of the member A to form the annular channel 20 for receiving a packing ring or material 21 for sealing the joint between the members A and B at their peripheries. A metallic clamp 22 receives and surrounds the flanges 18 and 19 and holds them together against the packing material. The hub end 16 of the member B has the threaded neck 23 receiving a nut 24 which abuts against the hub 10 of the member A and holds the wall 14 against the outer face of the hub, the connection being sufficiently yielding for relative rotation of the members A and B, the nut 24 and the clamp 22 serving merely to hold the elements intimately together to seal the intervening space against access of dust, grease, oil or other foreign matter.

The member A has a number of inner walls or partitions 25 extending between the flange 12 and the hub 10 and terminating flush with the outer face of the hub 10. Two such walls are shown diametrically opposite and with their sides 26 forming each a substantially semicylindrical surface. The member B has two diametrically opposite similar lugs or walls 27 extending from the disc 14 to project into the member A between the flange 12 and hub 10 thereof to be normally displaced 90° from the adjacent walls 25 on member A. The sides 28 of the walls 27 form substantially semi-cylindrical surfaces and these surfaces 26 and 28 of adjacent walls 25 and 27 form substantially cylindrical chambers or pockets 29 between the members A and B when these members are coupled together.

Each of the chambers 29 receives a resistance unit or member 30 preferably of non-compressible but mobile rubber. These units are made cylindrical and each has a central cylindrical core or space 31 which is concentric with the unit axis, the outer diameter of the unit being substantially equal to the diameter of the cylindrical pockets 29 in each of which pockets one of these units is placed between a wall 25 of member A and a wall 27 of member B so that when the members are rotated in one direction relative to each other one set of diametrically opposite units will be put under pressure, and when the relative movement is in the opposite direction the other set of diametrically opposite units will be put under pressure so that with the arrangement shown two opposite units will always resist relative movement of the members.

The rubber units thus constitute the motion transmission medium between the members A and B and where comparatively heavy power is transmitted the members A and B must be held more securely together. For this purpose threaded studs 32 may be extended from the member A to project through slots 33 in the member B for reception of washers and nuts to bear against the outer face of the member A, and similar studs 34 may be provided on the member A for projecting through slots in the member B for reception of washers and nuts. The slots are of sufficient circumferential extent relative to the axis of the members to prevent engagement between the studs and members, the stud serving merely to securely hold the members together in axial direction but to permit rotational relative movement thereof against the resistance of the rubber units 30.

As has been before explained, the member A may be the driving member connected with an automotive engine through the intermediary of clutch and transmission mechanism, and the driven member B may be connected through a suitable transmission train with the driving axle of the vehicle. When the propulsion power and clutch are thrown in, the resulting rotation of the member A will not be directly transmitted to the member B but will be resiliently transmitted thereto through the elastic and mobile cushioning units 30 interposed between the partitions 25 on the member A and the partitions 27 of the member B. There should be sufficient clearance space between the inner and outer ends of the relatively movable partition walls so that they may move toward each other and the chambers 29 may not therefore be of true cylindrical form but may be partially flattened at their outer and inner sides as shown in Figure 2. However, the units 30 are forced into these chambers to engage at all points of their outer surfaces with the adjacent sides of the partitions and of the hub and flange 12. During such insertion the units may be slightly flattened in radial directions but such distortion of the units will give them a primary or normal tensioning or setting to increase the initial resistance offered thereby when the members A and B move relatively. As the driving member A is suddenly started the inertia of rest of the part B resists rotation thereof through the intermediary of the elastic units, and these units are therefore put under pressure and the rubber of each unit is gradually displaced uniformly in substantially radial direction toward the central clearance space 31 and such displacement of the rubber continues until the inertia of the element B is overcome and this element starts to rotate. Then the rubber units relax and thereafter are contracted in correspondence with the running resistance of the element B and the parts to be driven connected therewith. Every particle or molecule of each of the elastic units is thus immediately brought into play when the driving member A is started and the particles perform uniform amounts of work in their resistance to remobilization under the pressure imparted thereto. There can be no concentration of pressure at some local point for extruding part of the rubber as there are no external clearance or overflow spaces adjacent to the units, but all displacements must be uniform and inwardly toward the centrally located clearance space 31. Diametrically this space 31 is proportioned to the volume of the surrounding mass, thus affording gradually increased resistance with its circumferential contraction toward greater and greater disproportion to the surrounding mass. The normal size of the clearance space is determined to be in proper relation and proportion to the volume and dimensions of the units and to the particular transmission or shock absorbing work to be accomplished by the units in the transmission of movement from one member to another.

Where the spaces 31 in the units are closed to the exterior during operation of the structure the air therein will be compressed and its resistance to compression will assist the units in their gradual absorption of abnormal motion and shock. In other words the transmission and absorption will be by a confined volume of compressible unstable fluid surrounded by a non-compressible elastic mobile medium such as rubber.

As a means for modifying the operation of the elastic units by adjustment of the available space between the partition walls for the units, I provide adjustment members 36 in the form of discs or washers interposed between one or both sides of the units and one or both of the transmission elements. By means of set screws 37 these adjusting elements may be shifted inwardly to effect the desired normal displacement of the rubber for the desired initial resistance of the units and the degree of cushioning thereof. Each adjusting element may also have a conical projection 38 for extending into the displacement space 31 of the respective resistance units. Such projections will keep the adjusting members in proper alignment with the units and will serve also to guide the units in their uniform displacement toward the clearance spaces 31. The extensions will also adjust the volumes of the spaces 31 in accordance with the setting or tensing of the units by the adjusting members. When the extensions 38 are conical as shown, the rubber of the units will be subjected to a uniform lateral displacement during uniform radial displacement thereof when the units are subjected to pressure between the partitions of the driving and driven elements, the operation of the units being thus correspondingly modified and symmetrically stepped up for the desired cumulative elastic transmission and shock absorbing results.

In order to reduce friction the outer faces of the adjusting elements 36 may be concave as shown so as to engage only at their peripheries with the metal of the element B.

To correct unavoidable shaft misalinement and angular impingement in member B, I have shown an improved universal coupling mechanism between the member B and a transmission shaft to be driven. The hub 16 terminates in a spherical socket composed of members 39 and 40, this socket receiving the hollow ball 41 extending from the hub 42 which in practice will be splined to a transmission shaft (not shown) forming part of the transmission train to the vehicle driving axle. The socket members 39 and 40 are secured together by screws 43 engaging the flanges 44 and 44' thereof. For connecting the socket and ball members for power transmission I have shown radially extending keys 45, the keys being cylindrical and preferably with semi-spherical ends. The keys extend through the passageways 46 in the ball member 41 and into circumferentially extending grooves or channels 47 in the socket structure, the channels extending preferably part way in each of the members 39 and 40 forming the socket member so as to facilitate assembly of the various parts.

Any number of keys may be used, the drawing showing in full lines two diametrically opposite keys, and another set of diametrically opposite keys may be provided in a line at right angles with the line of the keys shown. At their inner ends all of the keys bear in a bearing block 48 by which the keys are held radially extended with their outer ends in the channel 47, which channels are of semi-circular cross section to fit the semi-spherical ends of the keys. A very efficient universal coupling is thus formed for transmission of rotation from the element B to the element 42 independently of the relative angularity of the axes of the members B and 42.

The hub 42 may have holes 49 through which oil or grease may be charged into and discharged from the coupling, the holes being closable by screws or plugs 50. To distribute the oil or grease during operation of the coupling a distributor member 51 is provided on the outer end of a shaft or pin 52 which extends through the bearing block 48 and at its inner end is coupled by flexible means, such as a spring 53, to the end of a rod 54 threading through the hub 16 of the member B, the rod being provided at its outer end with a head 55 by which it may be adjusted and secured. During relative rotational movement between the socket and ball members of the joint the pin 52 will follow the movements of the block 48 which block follows the movements of the keys 45, and pivoted member or head 51 will then operate more or less eccentrically and like a piston to force grease inwardly and radially outwardly for proper distribution. The keys are preferably provided with channels 56 which may be spiral so that grease will be delivered into the guide channels 47 for lubrication. As the ball member rotates in the socket member grease channels 57 in the socket member will pick up grease and will carry it to the bearing surfaces of the members. A wiper 58 is suitably secured to the outer end of the socket members to engage against the surface of the ball member to prevent escape of grease and a suitable wiper 59 may be secured at the outer edge of the ball member hub 42 to engage against the transmission shaft (not shown) for preventing escape of grease.

The transmission link disclosed is of simple design and the elements A and B may be formed of cast steel and require no special tools nor dies to construct. The cylindrical elastic transmission units may also be inexpensively constructed and when installed they yieldingly and gradually transmit any sudden rotational movement of the driving member into easy starting and operation of the driven member without permitting any slack or back lash nor any direct metal to metal contact between the driving and driven members.

I have shown a practical and efficient embodiment of the various features of my invention but I do not wish to be limited to the exact construction, arrangement and operation shown as changes and modifications may be made without departing from the scope of the invention as defined by the appended claims.

I claim as follows:

1. The combination with relatively movable transmission members having walls forming closed cylindrical compartments, and a disc of non-compressible mobile rubber accurately fitting in each compartment and intimately engaged along its entire outer surface by said walls to be subjected to radial pressure during relative movement of said members, each rubber disc having an internal space forming the sole means for receiving the displaced rubber.

2. An elastic coupling comprising driving and driven members having semi-cylindrical cavities cooperating to form cylindrical pockets, and a disc of non-compressible mobile material in each of said pockets intimately engaged along its entire outer surface by said driving and driven members to be subjected to pressure and displacement during relative rotation of said members, each disc having a centrally located vacant space forming the sole means for receiving the displaced material.

3. In an elastic connection, a pair of relatively movable elements having walls cooperating to form closed substantially cylindrical compartments, and a transmission unit of elastic non-compressible mobile material entirely filling each compartment and being engaged on all sides by the walls forming said compartments, each transmission element having a single centrally located void forming the sole means for receiving the displaced material when under external pressure between said members.

4. A connection comprising two relatively movable members forming between them a closed substantially cylindrical compartment or space whose volume decreases as said members are moved toward each other, and a filler of elastic non-compressible mobile substance engaged at all times throughout its exterior by said member and having a single centrally located space for gradually receiving the displaced substance when subjected to pressure by movement of said members toward each other.

5. A connection comprising two relatively movable members forming between them a closed substantially cylindrical compartment or space whose volume decreases as said members are moved toward each other, and a filler of elastic non-compressible but mobile rubber engaged at all times throughout its exterior by said members and having a single centrally located space for gradually receiving the displaced rubber when subjected to pressure by movement of said members toward each other.

6. A transmission and shock absorbing connection comprising two relatively movable members forming between them a closed substantially cylindrical space whose volume decreases as said members are moved toward each other, a mobile practically non-compressible cohesive substance having the characteristics of rubber closely confined on all sides in said space to be subjected to pressure by movement of said members toward each other, said substance having a single void at substantially its center of gravity into which said substance is uniformly gradually displaced during the application of pressure by said members for gradually and resiliently resisting the pressure applying movement of said members.

7. In an elastic transmission, the combination of relatively movable walls forming closed substantially cylindrical compartments, a block of non-compressible mobile material initially compressed in each compartment to be intimately engaged along its entire side and circumferential surfaces during relative movement of said walls whereby to be subjected to pressure causing uniform radial displacement and circumferential contraction thereof, each block having an internal central space forming the sole means for receiving the displaced material of the block.

8. In an elastic transmission, the combination of side walls, stationary and movable walls between said side walls, said stationary and movable walls having opposed substantially semi-cylindrical concave surfaces whereby said walls together with said side walls form substantially cylindrical compartments, a cylindrical block of non-compressible elastic rubber snugly fitting in each compartment with its side and circumferential surface intimately engaged at all points by said walls, each block having an internal centrally located space, whereby when said movable walls approach said stationary walls said blocks will be subjected to pressure causing uniform radial displacement and circumferential contraction of said blocks.

9. An elastic coupling comprising driving and driven members having semi-cylindrical cavities cooperating to form cylindrical pockets, a disc of non-compressible mobile material in each of said pockets intimately engaged along its entire outer surface by said driving and driven members to be subjected to uniform radial pressure and displacement during relative rotation of said members, each disc having a central bore forming the sole means for receiving the displaced material, and plugs extending into the ends of said bores for guiding the displacement of the material into said bores.

10. An elastic coupling comprising driving and driven members having semi-cylindrical cavities cooperating to form cylindrical pockets, a disc of non-compressible mobile material in each of said pockets intimately engaged along its entire outer surface by said driving and driven members to be subjected to uniform radial pressure and displacement during relative rotation of said members, each disc having a centrally located bore forming the sole means for receiving the displaced material, and conical plugs extending into the ends of said bores for guiding the displacement of the material into said bores.

11. An elastic coupling comprising driving and driven members having semi-cylindrical cavities cooperating to form cylindrical pockets, a cylindrical block of non-compressible mobile material in each of said pockets intimately engaged along its entire outer surfaces by said driving and driven members to be subjected to uniform radial pressure and displacement during relative rotation of said members, each block having a centrally located bore therethrough forming the sole means for receiving the displaced material, plates engaging the sides of said blocks, and conical projections on said plates extending into said bores for guiding the displacement of the material thereinto.

12. A cushioning device comprising a mass of mobile non-compressible cohesive substance having the characteristics of rubber, walls forming a compartment for entirely and intimately engaging and enclosing said mass and being relatively movable and shaped to displace the mass substantially uniformly toward the center of pressure within the mass, said mass having a void therein at the center of pressure forming the sole means for receiving the displaced material, and a rigid member inserted in said void for guiding the displacement of the material.

13. A cushioning device comprising a mass of mobile non-compressible cohesive substance having the characteristics of rubber, walls forming a compartment for intimately engaging and enclosing said mass and being relatively movable and shaped to displace the mass substantially uniformly toward a central line, said mass having a bore whose axis coincides with said line and which forms the sole means for receiving the displaced material, and a rigid guide member extending into one end of said bore for guiding the displacement of the material.

14. A cushioning device comprising a mass of mobile non-compressible cohesive substance having the characteristics of rubber, walls forming a compartment for intimately engaging and enclosing said mass and being relatively movable and shaped to displace the mass substantially uniformly toward a common line, said mass having a bore whose axis coincides with said line and which forms the sole means for receiving the displaced material, and rigid guide members extending into the ends of said bore for guiding the displacement of the material.

GEORGE G. KITZMAN.